Patented Jan. 10, 1939

2,143,069

UNITED STATES PATENT OFFICE 2,143,069

METHOD OF PURIFYING SODIUM CARBONATE SOLUTION

Norman C. Hill and Charles Douglas Shannon, Saltville, Va., assignors to The Mathieson Alkali Works, Inc., New York, N. Y., a corporation of Virginia No Drawing. Application October 6, 1936, Serial No. 104,226

5 Claims. (Cl. 23—63)

This invention relates to the treatment of impure soda materials suitable for use in the production of caustic soda and has for an object the provision of an improved process for removing impurities from such materials.

Various by-products and waste soda materials frequently are available for conversion to caustic soda by causticization with lime. Among the materials available are caustic soda bottoms from the caustic pots delivering fused caustic soda, dirty soda ash from ammonia soda operations in every state of purity, dirty sodium bicarbonate, tower washings, tank washings and caustic soda wash water. These materials contain impurities such as silica, alumina and iron oxide far in excess of the amounts found in fresh soda ash. Some of the materials also are contaminated with oil and grease from equipment bearings. Solutions of such impure materials are unsuitable for the production of high quality caustic liquor, and the present invention is concerned with the purification of such solutions to make them available for use in the production of high quality caustic soda.

The present invention is based on our discovery that precipitation of alumina, silica and iron oxide from solutions of materials of the type described above may be accomplished by controlling the concentration of sodium bicarbonate therein. We have found, for example, that when the sodium bicarbonate concentration of such solutions is adjusted to about 33.6 grams per liter, most of the silica, alumina and iron oxide or hydroxide may be removed by filtration.

We have discovered, also, that, by adjusting the proportions of alumina and silica as well as the concentration of sodium bicarbonate in such solutions, practically all of the silica and alumina are rendered insoluble. If to such a solution, after adjustment of the sodium bicarbonate concentration to establish therein about 33.6 grams per liter of sodium bicarbonate and about 265 grams per liter of sodium carbonate, there is added sufficient soluble aluminum, such as sodium aluminate, to make a total of two molecules of $Al_2O_3$ for each molecule of $SiO_2$ present in the liquid phase nearly all of the silica and nearly all of the alumina are rendered insoluble. After filtration, the content of silica, alumina and iron oxide in the solution is approximately the same as or less than the content in a similar solution of clean soda ash. By varying the ratio of alumina to silica, either the silica content or the alumina content can be decreased slightly at the expense of the other, but the best results generally are to be obtained by the use of the proportion stated above.

If the solution or batch to be treated is prepared without the use of caustic soda bottoms, the filtered solution is somewhat turbid, due to dispersed oil and grease from the dirty ash. When, however, the caustic bottoms are used in making up a batch, the finely divided iron oxide, which the bottoms contain, adsorbs the dispersed oil and grease, and the filtrate is clear. Other substances which help in this filtration-clarification operation are alpha-cellulose, either as a filter medium or ground as a floc, and kieselguhr or infusorial earth commonly known as filter-aid. These substances are also useful as pre-coating agents in filtering the dirty ash solution.

Iron is slightly more soluble in the sodium carbonate solution containing $NaHCO_3$, than in the same solution containing a few grams of NaOH per liter. The difference is not great and lower $SiO_2$ and $Al_2O_3$ concentrations usually more than off-set the advantages of lower iron. If, however, a low iron content is more desirable than a minimum of $SiO_2$ and $Al_2O_3$, a lower bicarbonate content, down to about 16 grams $NaHCO_3$ per liter, can be used with advantage.

The total concentration of $Na_2CO_3$ in the treated solution is not important, although lowest quantities of the $SiO_2$, $Al_2O_3$ and $Fe_2O_3$ per unit of $Na_2CO_3$ are found when the concentration of $Na_2CO_3$ is 265 grams per liter or higher.

The temperature is not a controlling factor and the temperature of 50° C. to 60° C., obtained on dissolving the soda ash in cold water is quite suitable. Neither heating nor cooling is necessary under ordinary operating conditions unless a sodium carbonate concentration greater than 265 grams per liter is desired. It is necessary, of course, to keep the temperature high enough to keep the soda substances in solution, otherwise soda will be lost when the solution is filtered. Lower temperatures give somwhat lower $SiO_2$ and $Al_2O_3$ concentration than higher temperatures, although the difference is not marked.

The major portion of the sodium carbonate used for causticization frequently comes from decomposing slurries of crude sodium bicarbonate from the ammonia soda process. The solution so obtained is a mixture of $NaHCO_3$, with about 65 grams $NaHCO_3$ per liter. If to this solution be added either caustic soda wash water, from washing the caustic soda mud or a solution of sodium carbonate made from clean soda ash or dirty soda ash, or mixtures thereof in such quantities that the resultant liquor contains about 33.6 grams bicarbonate per liter and the soluble alumina be adjusted as previously described, then the original ash, as decomposer ash, may be purified so as to give a higher grade product for the manufacture of caustic soda low in silica, iron and alumina.

This method also offers a means of purification of caustic soda wash water which incidentally contains a considerable quantity of impurities.

The following example illustrates a process of the invention: Bicarbonate mother liquor containing approximately 110 grams per liter $NaHCO_3$ and 12.5 grams per liter $Na_2CO_3$ is run into the dirty ash pot together with water to make up the batch. Sufficient sodium bicarbonate is taken from any source, so that after the bicarbonate reacts with the NaOH in the caustic bottoms used (say 300 to 1000 pounds per batch) and the dirty soda ash is added, there will be about 33.6 grams $NaHCO_3$ per liter in the batch. The $Na_2CO_3$, as such, is suitably approximately 265 grams per liter, although we have operated both above and below this concentration.

After the batch has been prepared as directed, sodium aluminate is added in such quantity that two pound molecules of $Al_2O_3$ are added for each pound atom of silicon in the filtered solution; or the batch may be made up without caustic bottoms to such a concentration that after addition of the caustic bottoms the concentration will be 33.6 grams per liter $NaHCO_3$. To the caustic bottoms may be added either bauxite or purified $Al_2O_3$, prior to its being added to the dirty ash batch. This then supplies the sodium aluminate, when added to the batch, and brings the $NaHCO_3$ concentration to the correct value.

The silicon content of the filtered liquor is lowest at about 33.6 grams per liter $NaHCO_3$, at which concentration the solubility of $Al_2O_3$ is also minimum when the ratio of $Al_2O_3$ to silicon is about 2:1. The minimum point for $Al_2O_3$ varies however with the ratio, $Al_2O_3$:Si. $Fe_2O_3$ is lowest, when caustic is present. Since silica is a controlling factor and the hardest of the three substances to remove, we usually select the $NaHCO_3$ concentration as 33.6 grams per liter. The concentration of silicon at the lowest soluble silicon concentration for instance, may be shifted by varying the concentrations of the aluminum and iron. Since there is considerable silica in the insoluble portion of the dirty ash slurry, we have found it to be advisable to agitate the batch 45 minutes to 100 minutes. After 200 minutes the insoluble silica (sand, concrete dust from sweepings, etc.) becomes appreciably soluble and this defeats the purpose of the treatment. This may be offset by adding additional soluble aluminum or iron to drive the silica then soluble out of solution. Finer adjustments and therefore lower silica concentrations are obtainable after the first filtration from the sludge or slurry following the second adjustment of $Al_2O_3$ and $Fe_2O_3$ to decrease the silicon by a final filtration.

It should be noted that by merely adjusting the bicarbonate concentration to approximately 33.6 grams per liter more than half of the impurities are rendered insoluble, so that adjusting the other substances in solution, such as $Fe_2O_3$ and $Al_2O_3$, assists in giving a solution with the lowest quantity of such substance in solution.

We may employ a compound of magnesium in accordance with the teachings of United States patents to Koch, No. 1,997,691, and Hill, No. 2,012,854, to aid in reducing the total quantity of impurities in solution. The magnesium compound does not affect the $SiO_2$, but does remove $Al_2O_3$ and $Fe_2O_3$. Therefore, a process of the invention may include treatment of a solution by adjustment of the sodium bicarbonate concentration and the alumina-silicon ratio to lower the silicon content, and, after filtration, treatment of the filtrate with a magnesium compound to remove aluminum and iron.

For maximum reduction of impurities in the liquor, an excess of $Al_2O_3$ should be added to the dirty ash liquor at about 33.6 grams per liter $NaHCO_3$ concentration to lower the $SiO_2$, and the batch filtered. Then $Al_2O_3$ and iron can both be removed by the use of a magnesium compound such as MgO added to the clear liquor. Thus, a solution can first be purified with respect to $SiO_2$ and then with respect to $Al_2O_3$ and $Fe_2O_3$. For the final treatment with the magnesium compound, it is preferable to adjust the alkalinity to about 20 grams $NaHCO_3$ per liter. The magnesium compound is slightly more effective at this bicarbonate concentration than at the higher bicarbonate concentration used for the removal of the $SiO_2$.

We claim:

1. The method of treating impure substances, comprising sodium carbonate, and mixtures of sodium bicarbonate and sodium hydroxide in approximately equivalent proportions, which contain at least one impurity of the group comprising aluminum and silicon to produce a relatively pure product consisting essentially of sodium carbonate, which comprises adding to the mixture at least one of the first mentioned substances under such conditions of concentration and temperature as to produce an aqueous solution containing sodium carbonate in an amount equivalent to not less than about 265 grams per liter and sodium bicarbonate in an amount equivalent to about 33.6 grams per liter, adding to the solution one substance from the group consisting of soluble aluminum and silicon compounds as required to establish therein aluminum and silicon in proportion equivalent to two molecules of $Al_2O_3$ for each molecule of $SiO_2$, thereby reducing the capacity of the solution for maintaining silicon and aluminum dissolved therein and effecting precipitation of aluminum and silicon as a compound containing aluminum and silicon, and separating the said compound thus precipitated from the accompanying solution.

2. The method of purifying sodium carbonate solution containing one or more impurities of the group comprising silicon and aluminum which comprises mixing the solution with a substance containing at least one compound of the group consisting of sodium carbonate and sodium bicarbonate to adjust the compositon of the solution, and adjusting the temperature of the solution to establish therein sodium bicarbonate in an amount equivalent to from 16 to about 33.6 grams per liter, adding to the solution one substance from the group consisting of soluble aluminum and silicon compounds as required to establish therein aluminum and silicon in proportion equivalent to two molecules of $Al_2O_3$ for each molecule of $SiO_2$, thereby reducing the capacity of the solution for maintaining silicon and aluminum dissolved therein and effecting precipitation of silicon and aluminum as a compound containing silicon and aluminum, and separating the said silicon and aluminum compound thus precipitated from the accompanying solution.

3. The method of purifying sodium carbonate solution containing one or more impurities of the group comprising silicon and aluminum which comprises mixing the solution with a substance containing at least one compound of the group consisting of sodium carbonate and sodium bicarbonate to adjust the composition of the solution, and adjusting the temperature of the solution to establish therein sodium carbonate in an amount equivalent to not less than about 265 grams per liter and sodium bicarbonate in an amount equivalent to from 16 to about 33.6 grams per liter, adding to the solution one substance from the group consisting of soluble aluminum compounds in proportion equivalent to two molecules to $Al_2O_3$ for each molecule of $SiO_2$, thereby reducing the capacity of the solution for maintaining silicon and aluminum dissolved therein and effecting precipitation of silicon and aluminum as a compound containing silicon and aluminum, and separating the said silicon and aluminum compound thus precipitated from the accompanying solution.

4. The method of purifying sodium carbonate solution containing one or more impurities of the group comprising silicon and aluminum which comprises mixing the solution with a substance containing at least one compound of the group consisting of sodium carbonate and sodium bicarbonate to adjust the composition of the solution, and adjusting the temperature of the solution to establish therein sodium carbonate in an amount equivalent to not less than 265 grams per liter and sodium bicarbonate in an amount equivalent to about 33.6 grams per liter, adding to the solution one substance from the group consisting of soluble aluminum and silicon compound as required to establish therein aluminum and silicon in proportion equivalent to two molecules of $Al_2O_3$ for each molecule of $SiO_2$, thereby reducing the capacity of the solution for maintaining silicon and aluminum dissolved therein and effecting precipitation of silicon and aluminum as a compound containing silicon and aluminum, and separating the said silicon and aluminum compound thus precipitated from the accompanying solution.

5. The method of treating impure substances, comprising sodium carbonate, and mixtures of sodium bicarbonate and sodium hydroxide in approximately equivalent proportion, which contain at least one impurity of the group comprising aluminum and silicon to produce a relatively pure product consisting essentially of sodium carbonate, which comprises adding to the mixture at least one of the said substances under such conditions of concentration and temperature as to produce an aqueous solution containing sodium carbonate in an amount equivalent to not less than about 265 grams per liter and sodium bicarbonate in an amount equivalent to from 16 to about 33.6 grams per liter, adding to the solution one substance from the group consisting of soluble aluminum and silicon compounds as required to establish therein aluminum and silicon in proportion equivalent to two molecules of $Al_2O_3$ for each molecule of $SiO_2$, thereby reducing the capacity of the solution for maintaining silicon and aluminum dissolved therein and effecting precipitation of aluminum and silicon as a compound containing aluminum and silicon, and separating the said compound thus precipitated from the accompanying solution.

NORMAN C. HILL.
C. DOUGLAS SHANNON.

CERTIFICATE OF CORRECTION.

Patent No. 2,143,069. January 10, 1939.

NORMAN C. HILL, ET AL.

It is hereby certified that error appears in the printed specification of the above numbered patent requiring correction as follows: Page 3, first column, line 14, claim 3, after "aluminum" insert the words and silicon; and that the said Letters Patent should be read with this correction therein that the same may conform to the record of the case in the Patent Office.

Signed and sealed this 21st day of February, A. D. 1939.

(Seal)
Henry Van Arsdale.
Acting Commissioner of Patents.